United States Patent
Kiranyaz et al.

(10) Patent No.: US 11,630,040 B2
(45) Date of Patent: Apr. 18, 2023

(54) REAL-TIME STRUCTURAL DAMAGE DETECTION BY CONVOLUTIONAL NEURAL NETWORKS

(71) Applicant: QATAR UNIVERSITY, Doha (QA)

(72) Inventors: Serkan Kiranyaz, Doha (QA); Onur Avci, Doha (QA); Osama Abdel Qader Abdel Jaber, Doha (QA)

(73) Assignee: QATAR UNIVERSITY, Doha (QA)

( * ) Notice: Subject to any disclaimer, the term of this patent is extended or adjusted under 35 U.S.C. 154(b) by 1129 days.

(21) Appl. No.: 16/031,519

(22) Filed: Jul. 10, 2018

(65) Prior Publication Data

US 2019/0017911 A1 Jan. 17, 2019

Related U.S. Application Data

(60) Provisional application No. 62/531,066, filed on Jul. 11, 2017.

(51) Int. Cl.
| | |
|---|---|
| *G01N 3/02* | (2006.01) |
| *G01M 7/02* | (2006.01) |
| *E04B 1/24* | (2006.01) |
| *G06N 3/084* | (2023.01) |
| *G06N 3/02* | (2006.01) |

(52) U.S. Cl.
CPC .............. *G01N 3/02* (2013.01); *E04B 1/2403* (2013.01); *G01M 7/025* (2013.01); *G06N 3/02* (2013.01); *G06N 3/084* (2013.01); *E04B 1/24* (2013.01); *E04B 2001/2418* (2013.01)

(58) Field of Classification Search
None
See application file for complete search history.

(56) References Cited

PUBLICATIONS

Turker Ince, Member, IEEE, Serkan Kiranyaz, Senior Member, IEEE, Levent Eren, Member, IEEE, Murat Askar, and Moncef Gabbouj, Fellow, IEEE, Real-Time Motor Fault Detection by 1-D Convolutional Neural Networks, EEE Transactions on Industrial Electronics, vol. 63, No. 11, Nov. 2016 (Year: 2016).*
Onur Avci, Self-Organizing Maps for Structural Damage Detection: A Novel Unsupervised Vibration-Based Algorithm, ASCE, Jun. 15, 2015 (Year: 2015).*
Onur Avci, Osama Abdeljaber, Serkan Kiranyaz, and Daniel Inman, Structural Damage Detection in Real-Time: Implementation of 1D Convolutional Neural Networks for SHM Applications, 2017 (Year: 2017).*

(Continued)

*Primary Examiner* — Matthew G Marini
(74) *Attorney, Agent, or Firm* — Squire Patton Boggs (US) LLP

(57) ABSTRACT

Certain embodiments may generally relate to structural damage detection. An embodiment may be directed to method for identifying a presence and a location of structural damage. Such method may include training a convolutional neural network (CNN) for a joint of a structure, sending instructions to a modal shaker to induce an input to the structure, receiving, as a result of the induced input, a raw acceleration signal at the joint, computing, based on the trained CNN and the raw acceleration signal, an index value of the joint, and identifying, according to the index value, a presence of a location of structural damage of the structure. In a further embodiment, the index value represents a likelihood of damage at the joint.

12 Claims, 12 Drawing Sheets

(56) References Cited

PUBLICATIONS

Jonghoon Jin, Aysegul Dundar & Eugenio Culurciello, Flattened Convolutional Neural Networks for Feedforward Acceleration, Accepted as a workshop contribution at ICLR 2015 (Year: 2015).*
O. Abdeljaber et al., "Chapter 5, Quantification of Structural Damage with Self-Organizing Maps", The Society for Experimental Mechanics, Inc. 2016, Structural Health Monitoring, Damage Detection & Mechatronics, vol. 7, Conference Proceedings of the Society for Experimental Mechanics Series, DOI: 10.1007/978-3-319-29956-3_5, 11 pages.
O. Abdeljaber et al., "Nonparametric Structural Damage Detection Algorithm for Ambient Vibration Response: Utilizing Artificial Neural Networks and Self-Organizing Maps", 2016 American Society of Civil Engineers, Journal of Architectural Engineering, J. Archit. Eng., 2016, 22(2): 04016004, DOI: 10.1061/(ASCE)AE. 1943-5568.0000205, 14 pages.
O. Abdeljaber et al., "Dynamic Testing of a Laboratory Stadium Structure", Geotechnical and Structural Engineering Congress 2016, 10 pages.
S. Anton et al., "Reference-Free Damage Detection Using Instantaneous Baseline Measurements", AIAA Journal vol. 47, No. 8, Aug. 2009, DOI: 10.2514/1.43252, 13 pages.
O. Avci et al., "Self-Organizing Maps for Structural Damage Detection: A Novel Unsupervised Vibration-Based Algorithm", J. Perform Const. Facil., ASCE 04015043-1, DOI: 10.1061/(ASCE)CF. 1943-5509.0000801, 11 pages.
R. P. Bandara et al., "The Three-Stage Artificial Neural Network Method for Damage Assessment of Building Structures", Australian Journal of Structural Engineering, ISSN: 1328-7982 (Print) 2204-2261 (online) Journal homepage: https://www.tandfonline.com/loi/tsen20, https://doi.org/10.7158/13287982.2013.11465119, 14 pages.
M. Betti et al., "Damage Detection on a Three-Storey Steel Frame Using Artificial Neural Networks and Genetic Algorithms", Meccanica (2015) 50:875-886, DOI: 10.1007/s11012-014-0085-9, 12 pages.
P. Chun et al., "Bridge Damage Severity Quantification Using Multipoint Acceleration Measurement and Artificial Neural Networks", Hindawi Publishing Corporation, Shock and Vibration, vol. 2015, Article ID 789384, 11 pages, http://dx.doi.org/10.1155/2015/789384, 12 pages.
D. Ciresan et al., "Deep, Big, Simple Neural Nets for Handwritten Digit Recognition", Letter Communicated by Yann LeCun, Neural Computation 22, 3207-3220 (2010), 2010 Massachusetts Institute of Technology, 14 pages.
U. Dackermann et al., "Dynamic-Based Damage Identification Using Neural Network Ensembles and Damage Index Method", University of Technology Sydney, NSW, 2007, Australia, Advances in Structural Engineering vol. 13, No. 6 2010, 16 pages.
U. Dackermann et al., "Damage Identification Based on Response-only Measurements Using Cepstrum Analysis and Artificial Neural Networks", Structural Health Monitoring 2014, vol. 13(4) 430-444, DOI: 10.1177/1475921714542890, 15 pages.
E. Figueiredo et al., "Machine Learning Algorithms for Damage Detection Under Operational and Environmental Variability", Structural Health Monitoring 10(6) 559-572, DOI: 10.1177/1475921710388971, 14 pages.
L. Goh et al., "Prediction of Unmeasured Mode Shape Using Artificial Neural Network for Damage Detection", Jurnal Teknologi, 61:1 (2013) 57-66, www.jumaltcknologi.utm.my, ISSN 2180-3722, ISSN 0127-9696, 10 pages.

M. Gul et al., "Damage Assessment with Ambient Vibration Data Using a Novel Time Series Analysis Methodology", J. Struct. Eng., 2011, 137(12): 1518-1526, Dec. 2011, DOI: 10.1061/(ASCE)ST. 1945-541X .0000366, 9 pages.
S. Hakim et al., "Fault Diagnosis on Beam-Like Structures From Modal Parameters Using Artificial Neural Networks", Measurement 76 (2015) 45-61, www.elsevier.com/locate/measurement,http://dx.doi.org/10.1016/j. measurement.2015.08.021, 17 pages.
D. Hubel et al., "Receptive Fields of Single Neurones in the Cat's Striate Cortex", J. Physiol. (1959) 148, 574-591, The Johns Hopkins Hospital and University, Baltimore, Maryland., 18 pages.
S. Jiang et al., "Structural Damage Detection by Integrating Data Fusion and Probabilistic Neural Network", Advances in Structural Engineering vol. 9 No. 4 2006, 14 pages.
S. Kiranyaz et al., "Real-Time Patient-Specific ECG Classification by 1-D Convolutional Neural Networks", IEEE Transactions on Biomedical Engineering, vol. 63, No. 3, Mar. 2016, DOI: 10.1109/TBME.2015.2468589, 12 pages.
J. Lee et al., "Neural Networks-based Damage Detection for Bridges Considering Errors in Baseline Finite Element Models", Journal of Sound and Vibration 280 (2005) 555-578, www.elsevier.com/locate/jsvi, doi: 10.1016/j.sv.2004.01.003, 24 pages.
Y. Liu et al., "Structure Damage Diagnosis Using Neural Network and Feature Fusion", Engineering Applications of Artificial Intelligence 24 (2011) 87-92, www.elsevier.com/locate/engappai, doi:10.1016/j.engappai.2010.08.011, 6 pages.
M. Mehrjoo et al., "Damage Detection of Truss Bridge Joints Using Arlificial Neural Networks", Expert Systems with Applications 35 (2008) 1122-1131, www.sciencedirect.com, www.elsevier.com/locate/eswa, doi:10.1016/j. eswa.2007.08.008, 10 pages.
V. Meruane, "Online Sequential Extreme Learning Machine for Vibration-based Damage Assessment Using Transmissibility Data", Department of Mechanical Engineering, Universidad de Chile, 35 pages.
C. NG, "Application of Bayesian-Designed Artificial Neural Networks in Phase II Structural Health Monitoring Benchmark Studies", Australian Journal of Structural Engineering, ISSN: 1328-7982 (Print) 2204-2261 (online) Journal homepage: https://www.tandfonline.com/loi/tsen20, https://doi.org/10.7158/13287982.2014.11465144, 11 pages.
P. Pawar et al., "Damage Detection in Beams Using Spatial Fourier Analysis and Neural Networks", Journal of Intelligent Material Systems and Structures, vol. 18, Apr. 2007, DOI: 10.1177/1045389X06066292, 13 pages.
A. Santos et al., "Machine Learning Algorithms for Damage Detection: Kernel-based Approaches", Journal of Sound and Vibration 363 (2016) 584-599, www.elsevier.com/locate/jsvi,http://dx.doi.org/101016/j jsv.2015 11.008, 16 pages.
D. Scherer et al., "Evaluation of Pooling Operations in Convolutional Architectures for Object Recognition", University of Bonn, Institute of Computer Science VI, http://www.ais.uni-bonn.de, ICANN 2010, Part III, LNCS 6354, pp. 92-101, 2010, 10 pages.
C. Wen et al., "Unsupervised Fuzzy Neural Networks for Damage Detection of Structures", Structural Control and Health Monitoring 2007, 14:144-161, published online Oct. 12, 2005, www.interscience.wiley.com, DOI: 10.1002/stc.116, 18 pages.
L. Yan et al., "Substructure Vibration NARX Neural Network Approach for Statistical Damage Inference", Journal of Engineering Mechanics, Jun. 2013.139:737-747, DOI: 10.1061/(ASCE)EM.1943-7889.0000363, 11 pages.
X. Zhou et al., "Damage Localization of Cable-Supported Bridges Using Modal Frequency Data and Probabilistic Neural Network", Hindawi Publishing Corporation, Mathematical Problems in Engineering vol. 2014, Article ID 837963, 10 pages, http://dx.doi.org/10.1155/2014/837963, 11 pages.

* cited by examiner

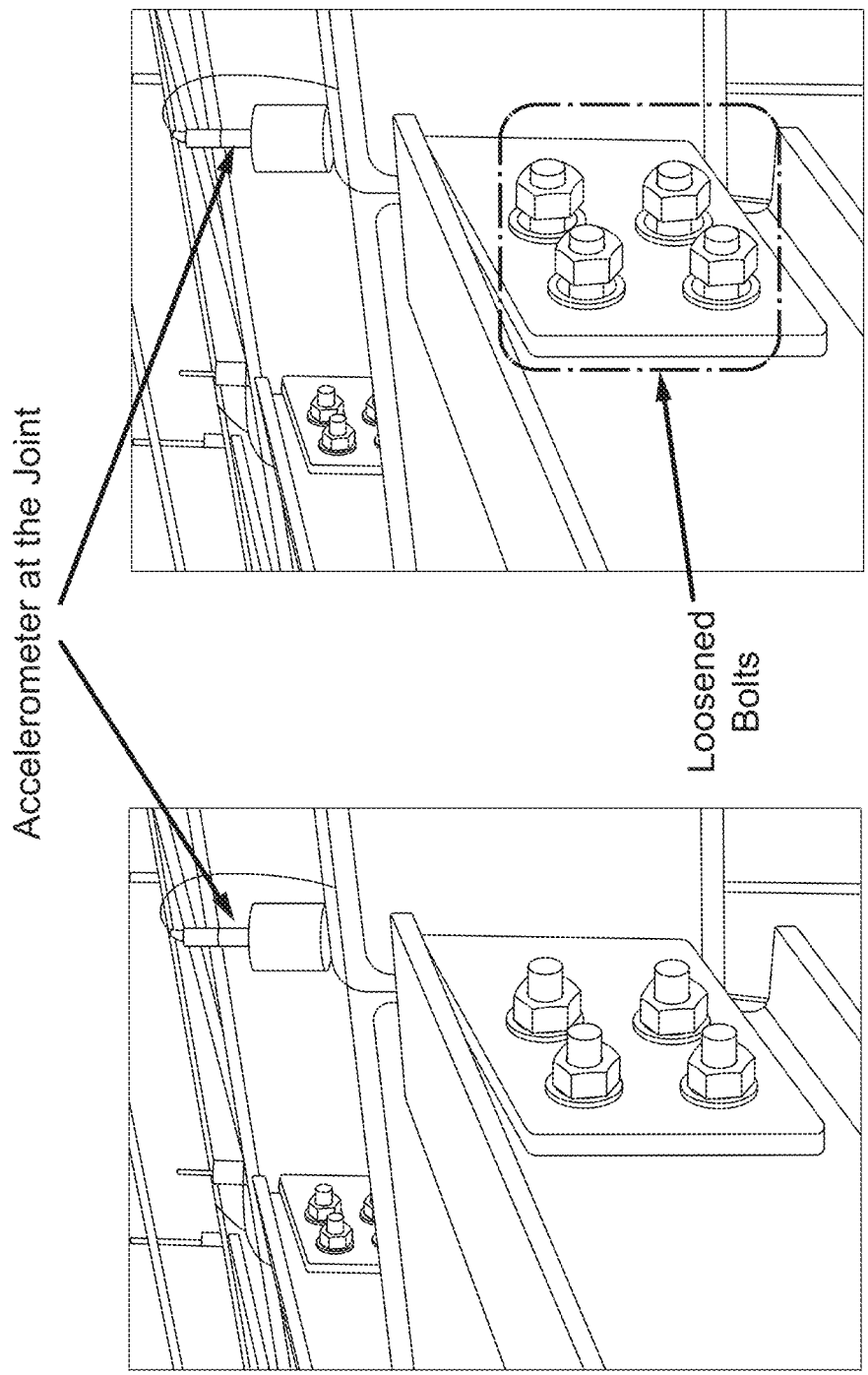

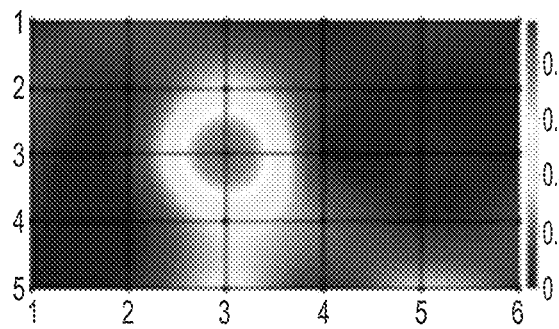
Case 9: Damage at Joint (3,3)
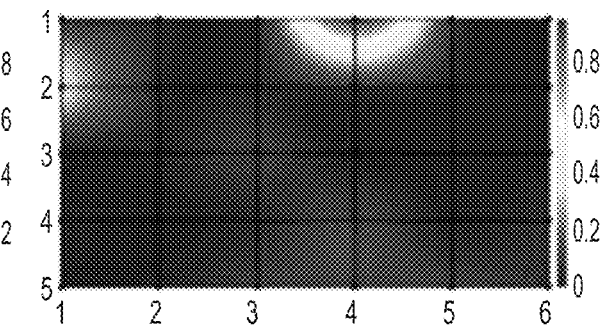
Case 10: Damage at Joint (4,1)
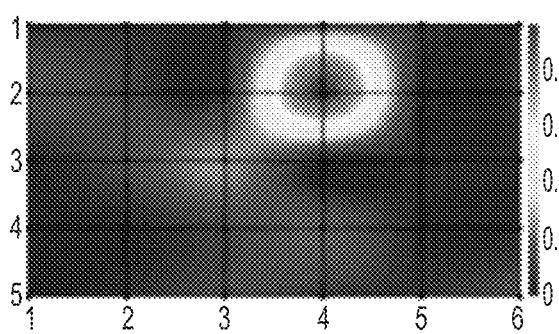
Case 11: Damage at Joint (4,2)
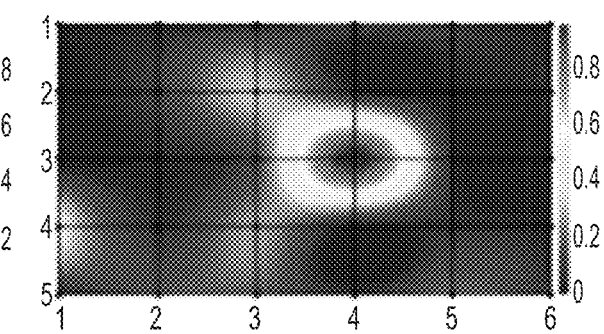
Case 12: Damage at Joint (4,3)
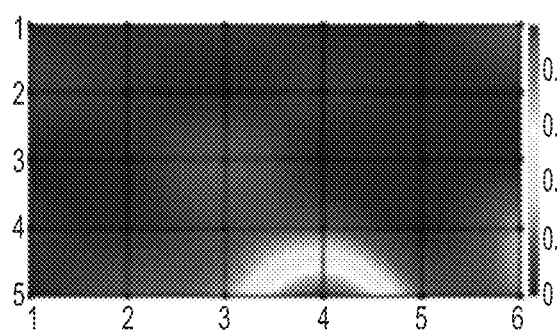
Case 13: Damage at Joint (4,5)
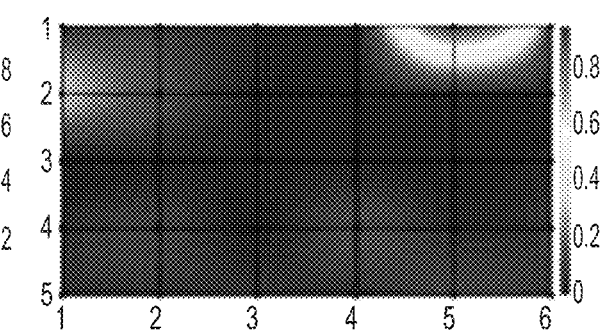
Case 14: Damage at Joint (5,1)
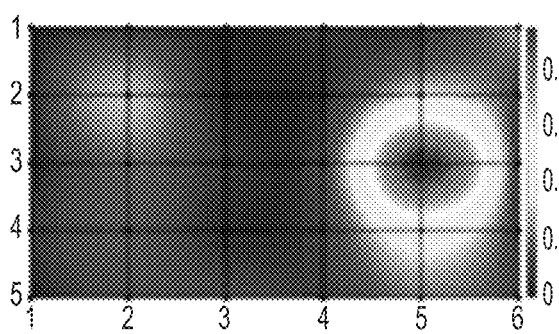
Case 15: Damage at Joint (5,3)
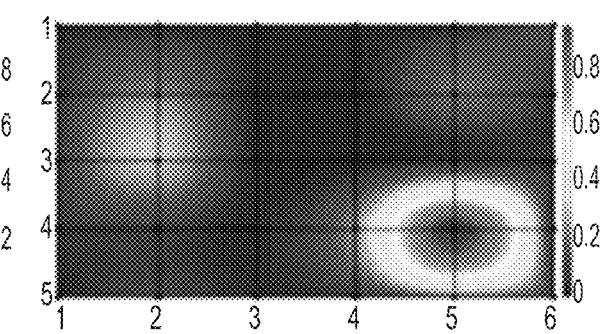
Case 16: Damage at Joint (5,4)
Figure 7(B)

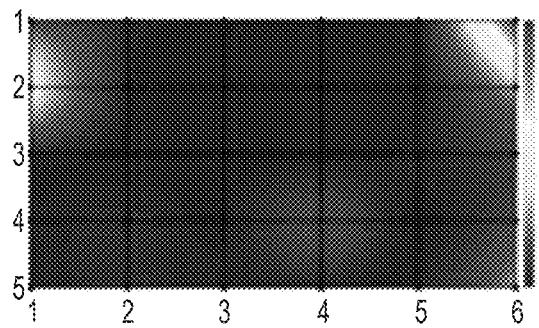
Case 17: Damage at Joint (6,1)
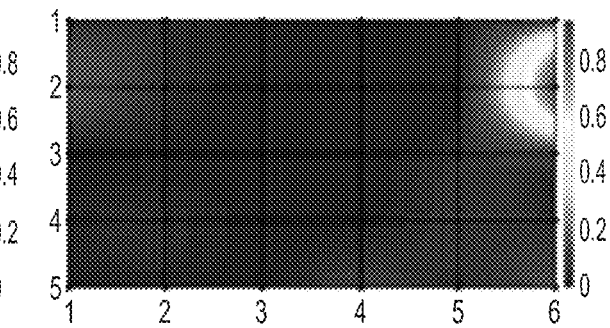
Case 18: Damage at Joint (6,2)
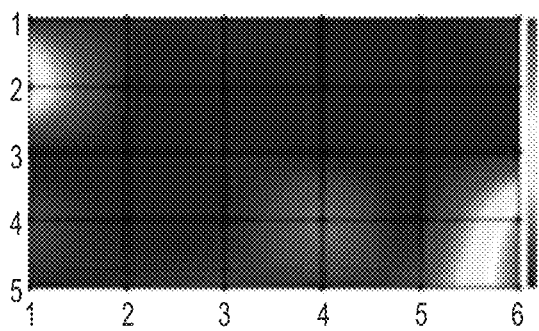
Case 19: Damage at Joint (6,5)
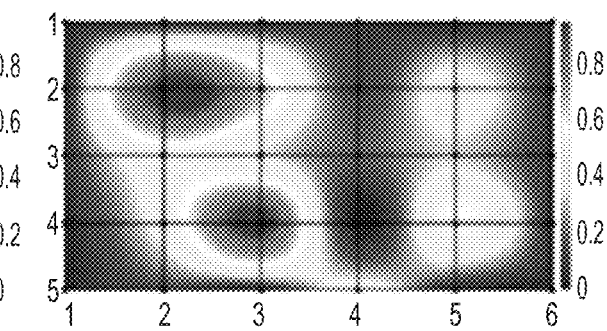
Case 20: Damage at Joint (2,2) and (3,4)
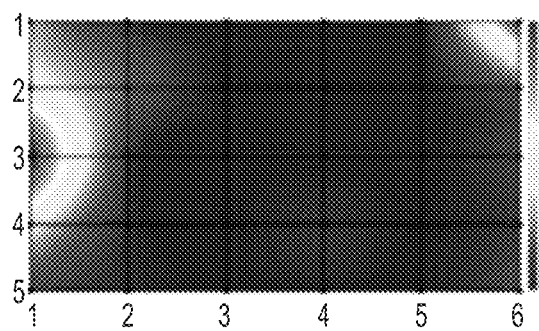
Case 21: Damage at Joint (1,3) and (6,1)
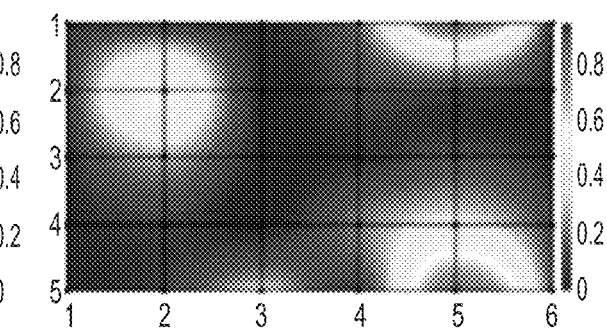
Case 22: Damage at Joint (5,1) and (5,5)
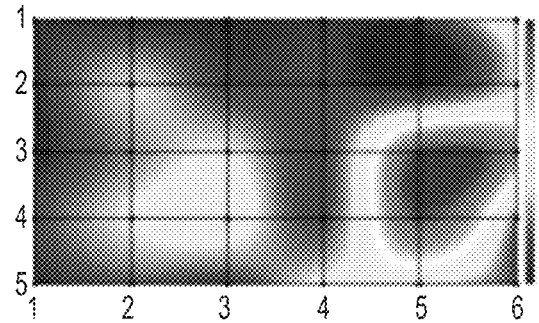
Case 23: Damage at Joint (5,3) and (5,4)
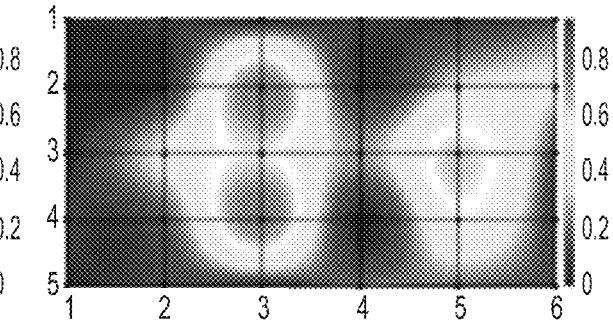
Case 24: Damage at Joint (3,3) and (5,3)
Figure 7(C)

the following detailed description, drawings and claims. More-

REAL-TIME STRUCTURAL DAMAGE DETECTION BY CONVOLUTIONAL NEURAL NETWORKS

CROSS REFERENCE TO RELATED APPLICATIONS

This application claims priority to U.S. Provisional Application No. 62/531,066, filed on Jul. 11, 2017. The entire contents of this earlier filed application are hereby incorporated by reference in their entirety.

FIELD OF THE INVENTION

Certain embodiments may generally relate to structural damage detection. More specifically, certain embodiments may generally relate to a structural damage detection system using 1D Convolutional Neural Networks (CNNs) that has an inherent adaptive design to fuse both feature extraction and classification blocks into a single and compact learning body.

BACKGROUND OF THE INVENTION

Engineering structures have always been susceptible to various kinds of damage (deterioration, degradation, corrosion, fatigue, creep, shrinkage, etc.) during their service life due to environmental, operational and human-induced factors. With their relatively large size, damage inspection of civil infrastructure has been reported to be laborious and expensive. Yet, the civil structures need to be inspected regularly to remain operational, improve the lifecycle performance, avoid catastrophic failures and protect human lives.

When damaged, the material and geometric characteristics of a structural component changes, affecting the stiffness and stability of the structure. Conventional damage assessment methods, which depend on periodic visual inspection of structures are not efficient especially for complex structures as they require highly-trained labor and easy access to the monitored structural members. Detecting, locating, and quantifying the structural damage in civil infrastructure have remained a constant challenge for researchers and engineers. Therefore, a significant amount of research has been conducted to develop automated local and global structural health monitoring (SHM) techniques.

Global (i.e., vibration-based) damage detection methods are generally used to assess the overall performance of the monitored structure by translating its vibration response into meaningful indices reflecting the actual condition of the structure. The ultimate goal of vibration-based methods is to identify the presence, severity, and location of the damaged areas by processing signals measured by a network of accelerometers. Vibration-based techniques can be classified into parametric (model-based) and nonparametric (signal-based) approaches. In parametric methods, system identification algorithms are utilized to determine the modal parameters such as natural frequencies and mode shapes from the measured response. Changes in these parameters with respect to the parameters identified for the undamaged case are used to recognize the structural damage. On the other hand, nonparametric approaches employ statistical means to identify damage directly from the measured signals.

In the past, machine learning algorithms have been extensively used by researchers to develop a wide range of parametric and nonparametric vibration-based structural damage detection techniques. The vast majority of machine learning based damage detection methods available in the literature generally involve two processes: (1) feature extraction; and (2) feature classification.

Parametric machine learning based methods available in the literature use different techniques to extract the modal parameters from the measured vibration response for several undamaged and damaged cases. In other words, the features extracted in these methods are simply the dynamic characteristics of the structure such as natural frequencies and mode shapes. On the other hand, in nonparametric machine learning based damage detection methods, several signal processing and statistical analysis techniques have been utilized for feature extraction. Additionally, various classifiers have been used in both parametric and nonparametric methods to classify the extracted features.

Therefore, a classical signal-based SHM approach may typically consist of a continuous acquisition of signals by sensors, extraction of certain (hand-crafted) features and feature classification by a classifier. Accordingly, it is imperative to extract damage-sensitive features correlated with the severity of the damage in the monitored structure, and to have a well-configured and trained classifier that has the utmost ability to discriminate those features. This is why the choice of both features extracted and the classifier used usually depends on a trial-and-error process for a particular structural damage detection application and significantly varies in the literature.

As previously discussed, such fixed features/classifiers that are either manually selected or hand-crafted may not optimally characterize the acquired signal and thus cannot accomplish a reliable performance level for damage detection. In other words, which feature extraction is the optimal choice for a particular signal and classifier remains unanswered up to date. Furthermore, feature extraction usually turns out to be a computationally costly operation, which eventually may hinder the usage of such methods for a real-time SHM application.

While the fixed and hand-crafted features may either be a sub-optimal choice for a particular structure or fail to achieve the same level of performance on another structure, they usually require a large computation power which may hinder their usage for a real-time SHM. Further, the performance of a classical SHM system primarily depends on the choice of the features and classifier. The fixed and hand-crafted features used may either be a sub-optimal choice for a particular structure, or fail to achieve the same level. Thus, there is a need for fast and accurate damage detection, as well as a need for developing robust SHM systems with the ability to identify and locate any structural damage.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

SUMMARY OF THE INVENTION

One embodiment may be directed to a method for identifying a presence and a location of structural damage. The method may include training a convolutional neural network (CNN) for a joint of a structure. The method may also include sending instructions to a modal shaker to induce an input to the structure. The method may further include receiving, as a result of the induced input, a raw acceleration signal at the joint. In addition, the method may include computing, based on the trained CNN and the raw acceleration signal, an index value of the joint. Further, the method may include identifying, according to the index value, a presence of a location of structural damage of the structure. In an embodiment, the index value represents a likelihood of damage at the joint.

In an embodiment, the computing of the index value may include dividing the acceleration signal to a number of frames that each include a total number of $n_s$ samples. Computing the index value may also include normalizing the frames between −1 to 1. Computing the index value may further include feeding the normalized frames measured at the joint to the CNN. Further, computing the index value may include determining a probability of damage (PoD) at the joint by dividing a number of frames classified s damaged by a total number of frames processed by the CNN.

In an embodiment, a high PoD value within a range of about 0.8 to about 1.0 provides an indication that the joint is likely to be damaged, and a low PoD value within a range of about 0.0 to about 0.5 provides an indication that the joint is likely to be undamaged. In another embodiment, the acceleration signal may be measured by an accelerometer that is disposed at the location of the joint. In a further embodiment, the training of the CNN may include conducting a plurality of experiments to generate a training data set for training the CNN. In another embodiment, each of the plurality of experiments may include measuring acceleration signals at an undamaged joint as a result of an application of a random shaker excitation at the undamaged joint. In a further embodiment, each of the plurality of experiments may include introducing damage at the undamaged joint to create a damaged joint, and measuring acceleration signals at the damaged joint as a result of the application of the random shaker excitation at the damaged joint.

Another embodiment may be directed to an apparatus, which may include at least one memory comprising computer program code, and at least one processor. The at least one memory and the computer program code may be configured, with the at least one processor, to cause the apparatus at least to train a convolutional neural network (CNN) for a joint of a structure. The at least one memory and the computer program code may also be configured, with the at least one processor, to cause the apparatus at least to send instructions to a modal shaker to induce an input to the structure. The at least one memory and the computer program code may further be configured, with the at least one processor, to cause the apparatus at least to receive, as a result of the induced input, a raw acceleration signal at the joint. The at least one memory and the computer program code may also be configured, with the at least one processor, to cause the apparatus at least to compute, based on the trained CNN and the raw acceleration signal, an index value of the joint, and identify, according to the index value, a presence of a location of structural damage of the structure. Further, in an embodiment, the index value may represent a likelihood of damage at the joint.

According to an embodiment, the at least one memory and the computer program code may also be configured, with the at least one processor, to cause the apparatus at least to, in the computation of the index value, divide the acceleration signal to a number of frames that each include a total number of $n_s$ samples, normalize the frames between −1 to 1, feed the normalized frames measured at the joint to the CNN, determine a probability of damage (PoD) at the joint by dividing a number of frames classified s damaged by a total number of frames processed by the CNN.

In an embodiment, a high PoD value within a range of about 0.8 to about 1.0 may provide an indication that the joint is likely to be damaged, and a low PoD value within a range of about 0.0 to about 0.5 may provide an indication that the joint is likely to be undamaged. In another embodiment, the acceleration signal may be measured by an accelerometer that is disposed at the location of the joint. In a further embodiment, the at least one memory and the computer program code may further be configured, with the at least one processor, to cause the apparatus at least to, in the training of the CNN, conduct a plurality of experiments to generate a training data set for training the CNN. In another embodiment, each of the plurality of experiments may include measuring acceleration signals at an undamaged joint as a result of an application of a random shaker excitation at the undamaged joint. According to an embodiment, each of the plurality of experiments may include introducing damage at the undamaged joint to create a damaged joint, and measuring acceleration signals at the damaged joint as a result of the application of the random shaker excitation at the damaged joint.

A further embodiment may be directed to a computer program, embodied on a non-transitory computer readable medium. The computer program, when executed by a processor, may cause the processor to train a convolutional neural network (CNN) for a joint of a structure, send instructions to a modal shaker to induce an input to the structure, and receive, as a result of the induced input, a raw acceleration signal at the joint. The computer program, when executed by a processor, may also cause the processor to compute, based on the trained CNN and the raw acceleration signal, an index value of the joint, and identify, according to the index value, a presence of a location of structural damage of the structure. In an embodiment, the index value may represent a likelihood of damage at the joint.

According to another embodiment, the computer program, when executed by the processor, may further cause the processor to, in the computation of the index value, divide the acceleration signal to a number of frames that each include a total number of $n_s$ samples, normalize the frames between −1 to 1, feed the normalized frames measured at the joint to the CNN, and determine a probability of damage (PoD) at the joint by dividing a number of frames classified s damaged by a total number of frames processed by the CNN.

In an embodiment, a high PoD value within a range of about 0.8 to about 1.0 may provide an indication that the joint is likely to be damaged, and a low PoD value within a range of about 0.0 to about 0.5 may provide an indication that the joint is likely to be undamaged. In another embodiment, the acceleration signal is measured by an accelerometer that is disposed at the location of the joint. According to a further embodiment, the computer program, when executed by the processor, may cause the processor to, in the training of the CNN, conduct a plurality of experiments to generate a training data set for training the CNN. In an embodiment, each of the plurality of experiments may include measuring acceleration signals at an undamaged joint as a result of an application of a random shaker excitation at the undamaged joint. In another embodiment, each of the plurality of experiments may include introducing damage at the undamaged joint to create a damaged joint, and measuring acceleration signals at the damaged joint as a result of the application of the random shaker excitation at the damaged joint.

BRIEF DESCRIPTION OF THE DRAWINGS

The accompanying drawings, which are included to provide a further understanding of the invention and are incor

FIG. 5(A) illustrates an undamaged joint of the grandstand simulator structure according to certain embodiments.

FIG. 5(B) illustrates a damaged joint of the grandstand simulator structure according to certain embodiments.

FIG. 7(B) illustrates PoD distributions for cases 9-16 in the second phase of the experimental work according to certain embodiments.

FIG. 7(C) illustrates PoD distributions for cases 17-24 in the second phase of the experimental work according to certain embodiments.

Figure 1:
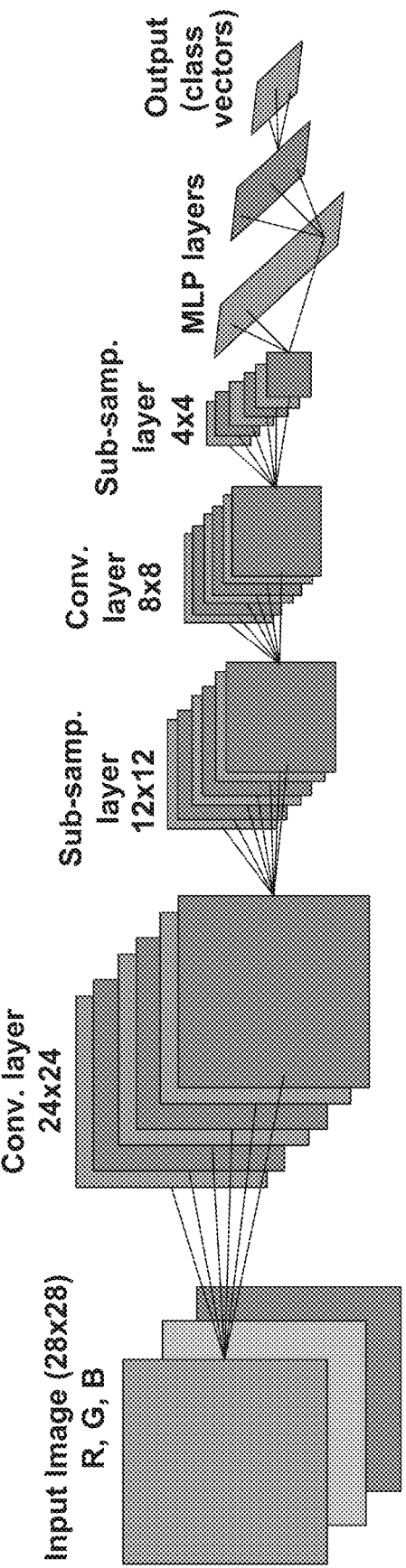
- FIG. 1 illustrates an overview of a sample conventional CNN.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

Certain embodiments are described herein for using various tools and procedures used by a software application to detect and determine a location of structural damage of a structure. The examples described herein are for illustrative purposes only. As will be appreciated by one skilled in the art, certain embodiments described herein, including, for example, but not limited to, those shown in FIGS. 1-9 embodied as a system, apparatus, method, or computer program product. Accordingly, certain embodiments may take the form of an entirely software embodiment or an embodiment combining software and hardware aspects. Software may include but is not limited to firmware, resident software, microcode, etc. Furthermore, other embodiments can take the form of a computer program product accessible from a computer-usable or computer-readable medium providing program code for use by or in connection with a computer or any instruction execution system.

Any combination of one or more computer usable or computer readable medium(s) may be utilized with various embodiments described herein. For the purposes of this description, a computer-usable or computer readable medium can be any apparatus that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may independently be any suitable storage device, such as a non-transitory computer-readable medium. Suitable types of memory may include, but not limited to: a portable computer diskette; a hard disk drive (HDD), a random access memory (RAM), a read-only memory (ROM); an erasable programmable read-only memory (EPROM or Flash memory); a portable compact disc read-only memory (CDROM); and/or an optical storage device.

The memory may be combined on a single integrated circuit as a processor, or may be separate therefrom. Furthermore, the computer program instructions stored in the memory may be processed by the processor can be any suitable form of computer program code, for example, a compiled or interpreted computer program written in any suitable programming language. The memory or data storage entity is typically internal, but may also be external or a combination thereof, such as in the case when additional memory capacity is obtained from a service provider. The memory may also be fixed or removable.

The computer usable program code (software) may be transmitted using any appropriate transmission media via any conventional network. Computer program code, when executed in hardware, for carrying out operations of certain embodiments may be written in any combination of one or more programming languages, including, but not limited to, an object oriented programming language such as Java, Smalltalk, C++, C# or the like and conventional procedural programming languages, such as the "C" programming language or similar programming languages. Alternatively, certain embodiments may be performed entirely in hardware.

A classical signal-based SHM approach may include a continuous acquisition of signals by sensors, extraction of certain (hand-crafted) features and feature classification by a classifier. In certain cases, it may be important to extract damage-sensitive features correlated with the severity of the damage in the monitored structure, and a well-configured and trained classifier that has the utmost ability to discriminate those features. This may be why the choice of both features extracted and the classifier used usually depends on a trial-and-error process for a particular SHM application. Such fixed features/classifiers that are either manually selected or hand-crafted, may not optimally characterize the acquired signal and, thus, cannot accomplish a reliable performance level for SHM. In other words, it may be challenging to determine which is the optimal choice for a particular signal (SHM data) and classifier. In addition, feature extraction may turn out to be a computationally costly operation which eventually may hinder the usage of such methods for a real-time SHM application.

Certain embodiments may implement Convolutional Neural Networks (CNNs). CNNs are generally known as a standard for "Deep Learning" tasks such as object recognition in large image archives as they achieved the state-of-the-art performances, with a significant performance gap. Typically, CNNs are feed-forward artificial neural networks (ANNs) that have both alternating convolutional and sub-sampling layers. As the convolutional layers basically model the cells in the human visual cortex, CNNs are developed primarily for 2D signals such as images and video frames. However, 1D CNNs have successfully been used for the classification of electrocardiogram (ECG) beats achieving the state-of-the-art performance in terms of both accuracy and speed. Furthermore, 1D CNNs have achieved the fastest solution with an elegant accuracy for fault detection in high power engines. A reason behind such superiority may be in the configuration of CNNs. Convolutional layers generally use linear filters, whose parameters are optimized during the training process. These filters may extract crucial information (features), which characterize the object/pattern in an image/signal. The convolutional layers may be followed by a feed-forward and fully connected layers, which are identical to the hidden layers of multi-layer perceptrons (MLPs) where the classification task is mainly realized. As a result, regardless of the variations in the signal characteristics and patterns, CNNs may have the natural ability to learn the optimal features and the classifier parameters in a combined optimization process, known as back-propagation (BP).

Furthermore, CNNs are biologically inspired feed-forward ANNs that present a simple model for the mammalian visual cortex. FIG. 1 illustrates an overview of a sample 2D CNN model with an input layer accepting 28×28 pixel images, according to a conventional CNN. As shown in FIG. 1, each convolution layer after the input layer alternates with a sub-sampling layer, which decimates the propagated 2D maps from the neurons of the previous layer. Unlike hand-crafted and fixed parameters of the 2D filter kernels, in CNNs they are trained (optimized) by the back-propagation (BP) algorithm. However, the kernel size and the sub-sampling factor, which are set to 5 and 2, respectively, for illustration purposes in FIG. 1, are two major parameters of the CNN. The input layer may only be a passive layer that accepts an input image and assigns its (R,G,B) color channels as the feature maps of its three neurons. With forward propagation over a sufficient number of sub-sampling layers, they may be decimated to a scalar at the output of the last sub-sampling layer. The following layers are identical to the hidden layers of a MLP, fully-connected and feed-forward. These so called fully-connected layers may end up with the output layer that produces the decision (classification) vector.

Figure 2:
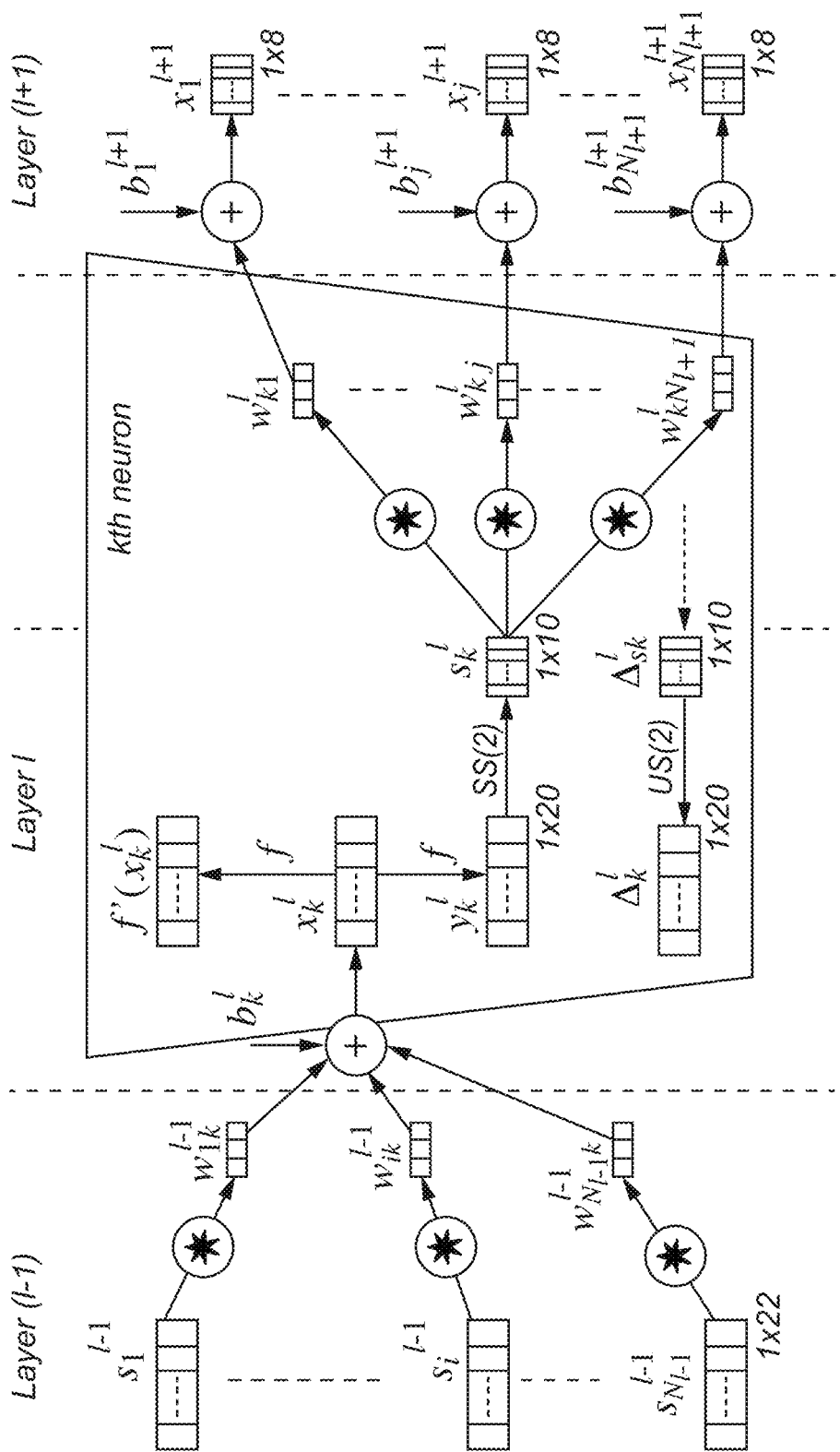
FIG. 2 illustrates convolutional layers of an adaptive 1D CNN according to certain embodiments.

According to certain embodiments, an adaptive 1D CNN configuration may be used in order to fuse feature extraction and learning (damage detection) phases of raw accelerometer data. The adaptive CNN topology may allow the variations in the input layer dimension. In particular, FIG. 2 shows convolution layers of the adaptive 1D CNN configuration according to certain embodiments. As shown in FIG. 2, the compact CNN layer structure has hidden neurons of the convolution layers that can perform both convolution and sub-sampling operations. As such, the fusion of the convolution and the sub-sampling layers may be known as the "CNN layer" to make a distinction, and the remaining layers may be known as the fully-connected layers that are identical to the hidden layers of an MLP. As a result, the adaptive 1D CNNs may be composed of an input layer, hidden CNN layers, and fully-connected layers that end up with an output layer.

As seen in FIG. 2, structural differences are visible between the traditional 2D and the 1D CNNs according to certain embodiments. For example, there is a difference between the use of 1D arrays instead of 2D matrices for both kernels and feature maps. Thus, the 2D matrix manipulations, such as 2D convolution (conv2D) and lateral rotation (rot180) have been replaced by their 1D counterparts, conv1D and reverse operations. In addition, the parameters for the kernel size and the sub-sampling are now scalars, K and ss for the 1D CNNs, respectively. However, the fully-connected layers are identical to their 2D counterpart and, therefore it has the same BP formulation.

According to certain embodiments, in 1D CNNs, the 1D forward propagation (FP) from the previous convolution layer, l−1, to the input of a neuron in the current layer, l, can be expressed as:

$$x_k^l = b_k^l + \sum_{i=1}^{N_{l-1}} conv1D(w_{ik}^{l-1}, s_i^{l-1}) \tag{1}$$

where $x_k^l$ is the input, $b_k^l$ is a scalar bias of the $k^{th}$ neuron at layer l, and $s_i^{l-1}$ is the output of the $i^{th}$ neuron at layer l−1. $w_{i,k}^{l-1}$ is the kernel weight from the $i^{th}$ neuron at layer l−1 to the $k^{th}$ neuron at layer l. The intermediate output of the neuron, $y_k^l$ can then be expressed from the input $x_k^l$, as follows:

$$y_k^l = f(x_k^l) \text{ and } s_k^l = y_k^l \downarrow ss \tag{2}$$

where $s_k^l$ is the output of the neuron and L ss represents the down-sampling operation with the factor, ss.

In certain embodiments, the adaptive CNN configuration may require automatic assignment of the sub-sampling factor of the output CNN layer (the last CNN layer). In particular, it may be set to the size of its input array. For instance, in FIG. 2, it may be assumed that layer l+1 is the last CNN layer, then the parameter ss may be automatically assigned to 8, which is the input array size. Such design allows the usage of any number of CNN layers.

According to certain embodiments, a training methodology may be provided called BP. As noted above, CNNs may have the natural ability to learn the optimal features and the classifier parameters in a combined optimization process. The BP steps may be formulated as follows. The BP of the error may start from the output fully-connected layer. For instance, let l=1 and l=L be the input and output layers, respectively. Also, let $N_L$ be the number of classes in the database. For an input vector p, and its corresponding target and output vectors, $t_i^p$ and $[y_1^L, \ldots, y_{N_L}^L]$, respectively, the mean-squared error (MSE) in the output layer for the input p, $E_p$, can be expressed as:

$$E_p = MSE(t_i^p, [y_1^L, \ldots, y_{N_L}^L]) = \sum_{i=1}^{N_L}(y_i^L - t_i^p)^2 \qquad (3)$$

An objective of the BP is to minimize the contributions of the network parameters to this error. Therefore, it is needed to compute the derivative of the MSE with respect to an individual weight (connected to that neuron, k) $w_{ik}^{l-1}$, and bias of the neuron k, $b_k^l$, so that a gradient descent method can be performed to minimize their contributions and hence the overall error in an iterative manner. Specifically, the delta of the $k^{th}$ neuron at layer l, $\Delta_k^l$ may be used to update the bias of that neuron and all weights of the neurons in the previous layer connected to that neuron as:

$$\frac{\partial E}{\partial w_{ik}^{l-1}} = \Delta_k^l y_i^{l-1} \text{ and } \frac{\partial E}{\partial b_k^l} = \Delta_k^l \qquad (4)$$

Thus, from the first MLP layer to the last CNN layer, the regular (scalar) BP may simply be performed as:

$$\frac{\partial E}{\partial s_k^l} = \Delta s_k^l = \sum_{i=1}^{N_{l+1}} \frac{\partial E}{\partial x_i^{l+1}} \frac{\partial x_i^{l+1}}{\partial s_k^l} = \sum_{i=1}^{N_{l+1}} \Delta_i^{l+1} w_{ki}^l \qquad (5)$$

Once the first BP is performed from the next layer l+1, to the current layer l, then it may be possible to further back-propagate it to the input delta $\Delta_k^l$. In such a case, let zero order up-sampled map be $us_k^l=up(s_k^l)$, then one can write:

$$\Delta_k^l = \frac{\partial E}{\partial y_k^l} \frac{\partial y_k^l}{\partial x_k^l} = \frac{\partial E}{\partial us_k^l} \frac{\partial us_k^l}{\partial y_k^l} f'(x_k^l) = up(\Delta s_k^l)\beta f'(x_k^l) \qquad (6)$$

where $\beta = (ss)^{-1}$ since each element of $s_k^l$ was obtained by averaging ss number of elements of the intermediate output, $y_k^l$. The inter BP of the delta error $$\left(\Delta s_k^l \overset{\Sigma}{\leftarrow} \Delta_i^{l+1}\right)$$

can be expressed as:

$$\Delta s_k^l = \sum_{i=1}^{N_{l+1}} conv1Dz(\Delta_i^{l+1}, rev(w_{ki}^l)) \qquad (7)$$

where rev(.) reverses the array and conv 1Dz(., ,.) performs full convolution in 1D with K−1 zero padding. Finally, the weight and bias sensitivities can be expressed as:

$$\frac{\partial E}{\partial w_{ik}^l} = conv1D(s_k^l, \Delta_i^{l+1}) \text{ and } \frac{\partial E}{\partial b_k^l} = \sum_n \Delta_k^l(n) \qquad (8)$$

As a result, the iterative flow of the BP algorithm can be written as the following:
1. Initialize all weights (usually randomly, U(−α, α))
2. For each BP iteration DO:
   a. For each item (or a group of items or all items) in the dataset, DO:
     i. FP: Forward propagate from the input layer to the output layer to find outputs of each neuron at each layer, $y_i^l$, $\forall i \in [1, N_l]$ and $\forall l \in [1, L]$.
     ii. BP: Compute delta error at the output layer and back-propagate it to first hidden layer to compute the delta errors, $\Delta_k^l$, $\forall k \in [1, N_l]$ and $\forall l \in [2, L−1]$.
     iii. PP: Post-process to compute the weight and bias sensitivities.
     iv. Update: Update the weights and biases with the (accumulation of) sensitivities found in (c) scaled with the learning factor, $\epsilon$:

$$w_{ik}^{l-1}(t+1) = w_{ik}^{l-1}(t) - \varepsilon \frac{\partial E}{\partial w_{ik}^{l-1}} \qquad (9)$$

$$b_k^l(t+1) = b_k^l(t) - \varepsilon \frac{\partial E}{\partial b_k^l} \qquad (10)$$

Figure 3:
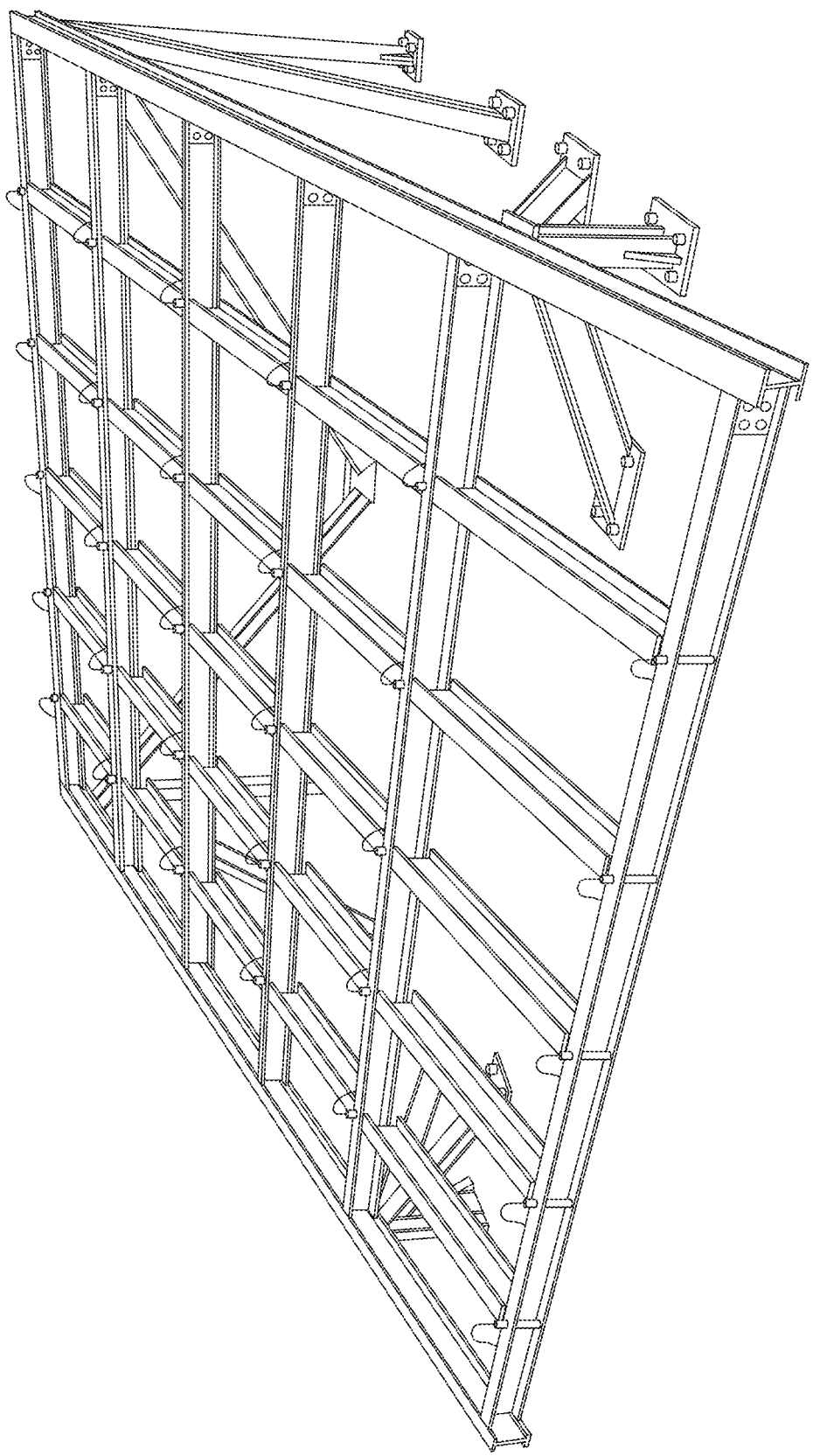
FIG. 3 illustrates an instrumental main steel frame grandstand simulator structure according to certain embodiments.

According to certain embodiments, it may be possible to accurately detect damages (if any), and identify the location of the damaged areas of a structure. To do so, in certain embodiments, may require designing and training a unique 1D CNN for joints of an example structural simulator. FIG. 3 illustrates an instrumental main steel frame grandstand simulator structure according to certain embodiments. The simulator structure may have dimensions of 4.2 m×4.2 m. As shown in FIG. 3, the steel frame may include 8 main girders and 24 filler beams supported on 4 columns. The 8 girders may be about 4.6 m long, while the length of the 5 filler beams in the cantilevered portion may be about 1 m, and the length of the remaining 20 beams may be 77 cm each. The length of the two long columns may be around 1.65 m. The filler beams may be removable and interchangeable, and many structural damage scenarios may be simulated either by loosening the bolts at beam-to-girder connections, or by replacing some of the filler beams with damages ones.

As shown in FIG. 3, the main steel frame of the simulator structure may be equipped with a total of 30 accelerometers installed on the main girders at the 30 joints. In an embodiment, 27 PCB model 393B04 accelerometers, and 3 B&K model 8344 accelerometers may be used. Further, PCB model 080A121 magnetic mounting plates may be used to attach the accelerometer to the steel structure. In addition, a modal shaker (Model 2100E11) may be used to apply vibration on the structure. The signal may be applied to the shaker through an amplifier, such as a SmartAmp 210E21-400 power amplifier. Further, two 16-channel data acquisition devices may be used to generate the shaker input and collect the acceleration output.

The CNN-based algorithm according to certain embodiments may require designing and training a unique 1D CNN for each one of the 30 joints instrumented with accelerometers in the structural simulator. However, the CNN-based algorithm is not limited to the simulator structure shown in FIG. 3, and according to other embodiments may be applicable to structures other than the simulator structure. Each CNN may be responsible for assessing the condition of one joint using only the raw acceleration signal measured at that joint. Thus, the damage detection may be decentralized since each CNN is capable of detecting damage at its respective joint independently from the other CNNs.

Figure 4:
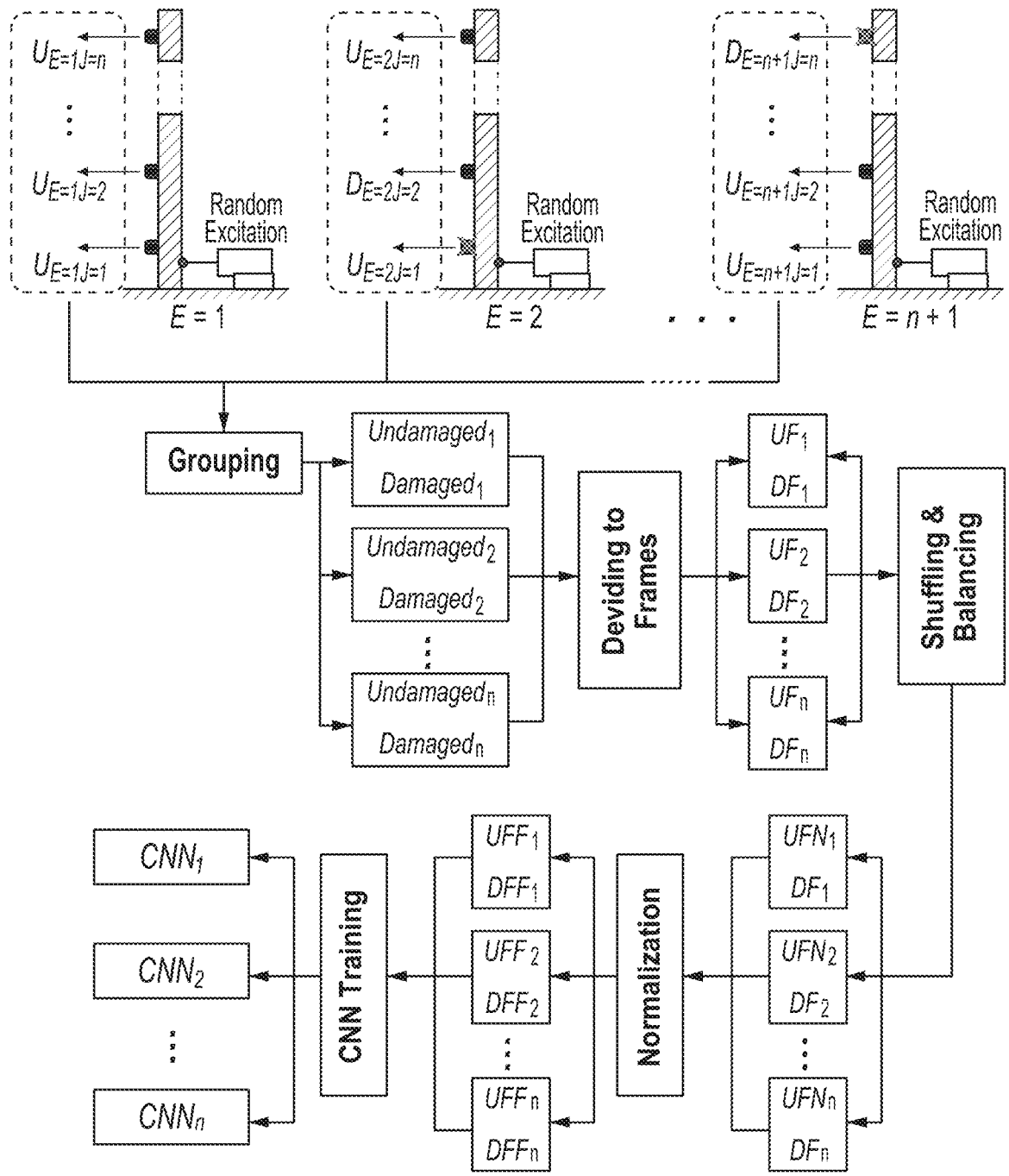
FIG. 4 illustrates data generation and a training process of CNNs according to certain embodiments.
Figure 6A:
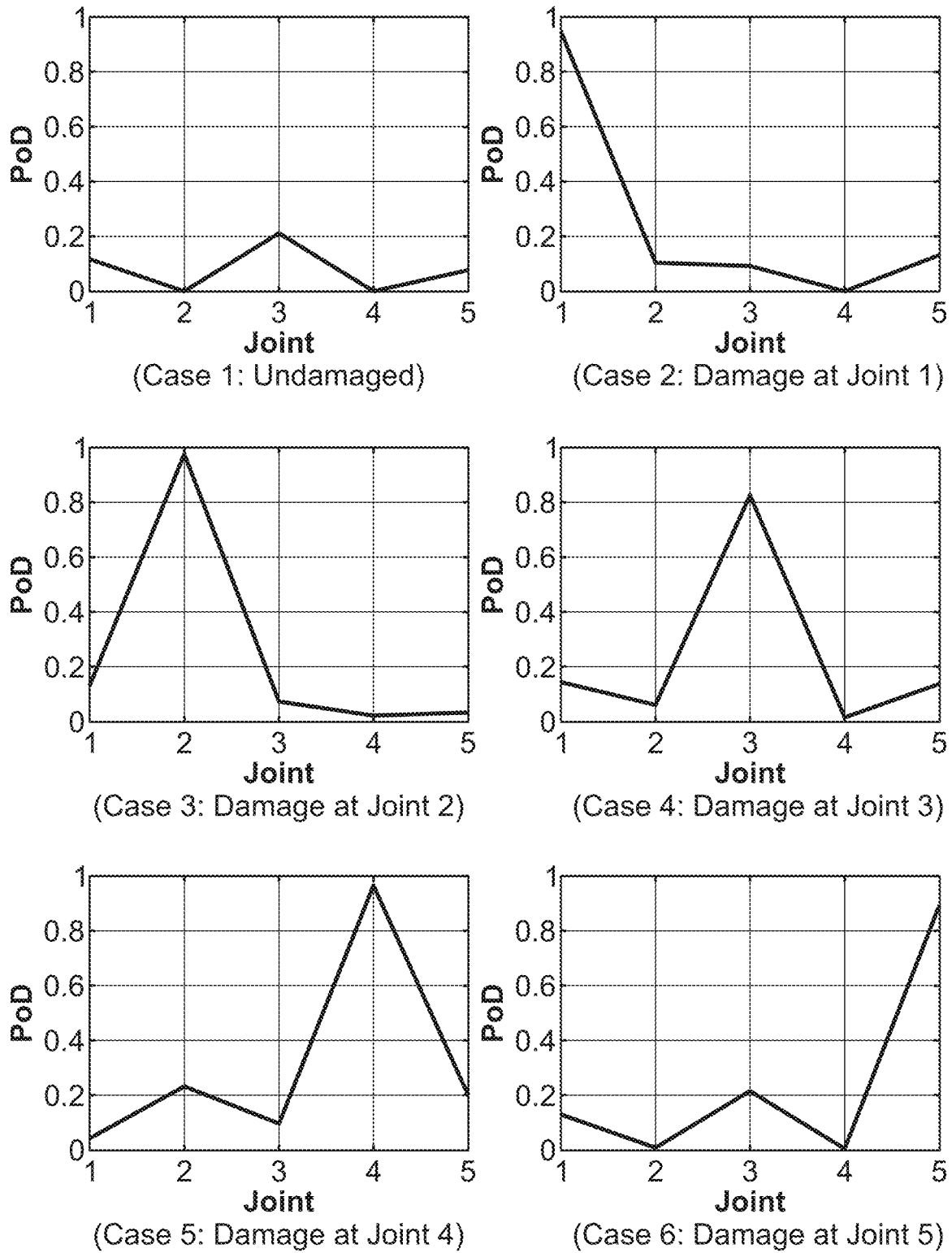
FIG. 6(A) illustrates probability of damage (PoD) distributions for cases 1-6 in a first phase of an experimental work according to certain embodiments.
Figure 6B:
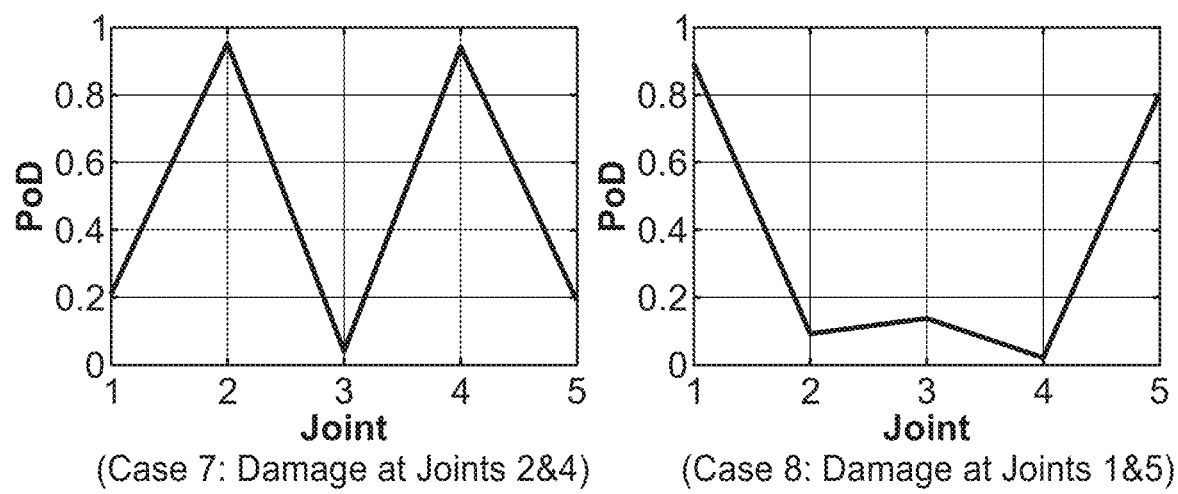
FIG. 6(B) illustrates PoD distributions for cases 7 and 8 in the first phase of the experimental work according to certain embodiments.
Figure 7A:
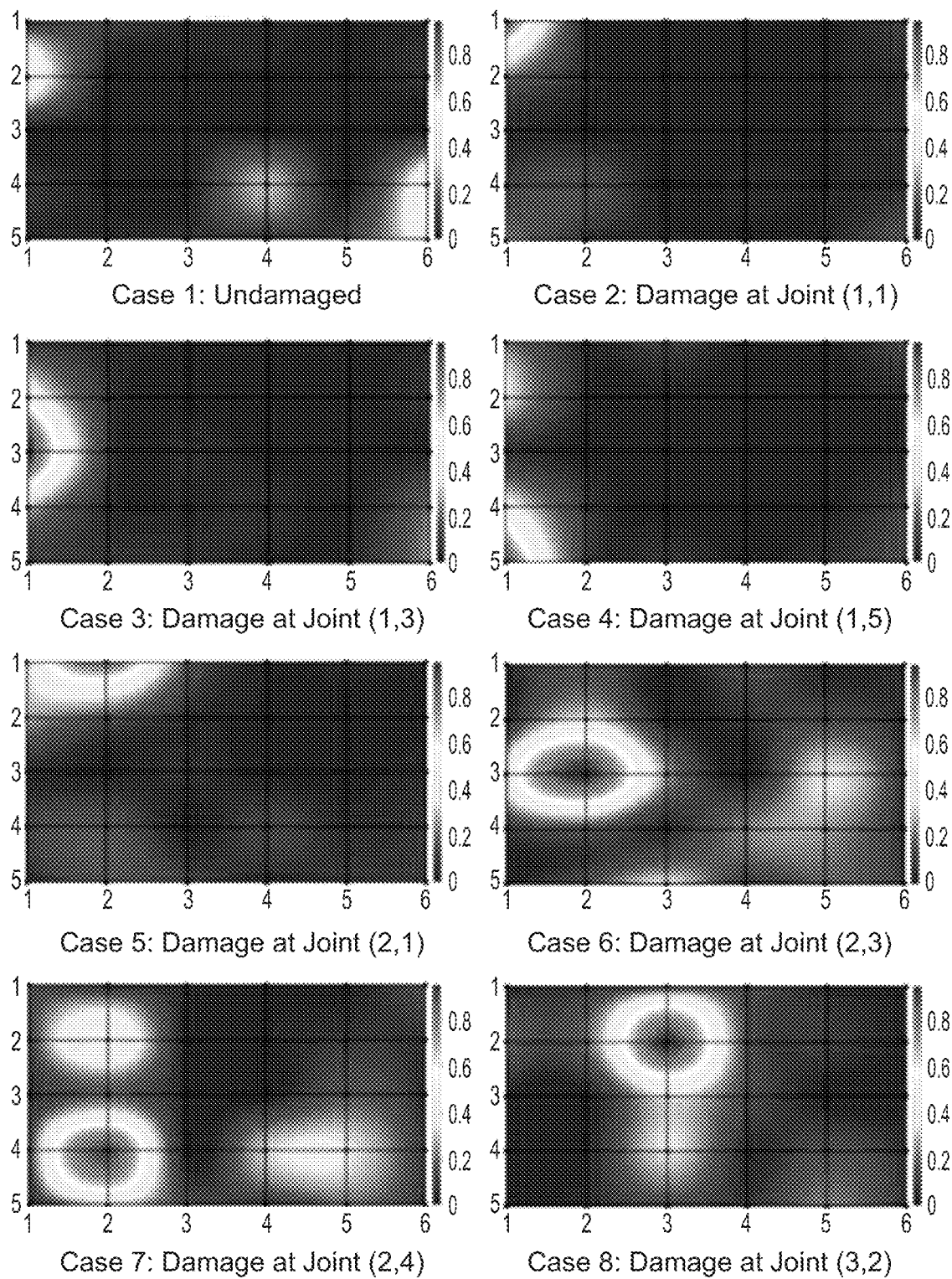
FIG. 7(A) illustrates PoD distributions for cases 1-8 in a second phase of the experimental work according to certain embodiments.

FIG. 4 illustrates data generation and a training process of CNNs according to certain embodiments. In certain embodiments, training the CNNs may include generating a data set that consists of a number of undamaged/damaged acceleration signals for each joint. For a structure having a total of n joints (or accelerometers) as shown in FIG. 4, a unique CNN may be assigned to each joint resulting in a total of n CNNs. To generate the training data set needed to train the CNNs, n+1 experiments may be conducted. In the first experiment (E=1), n acceleration signals may be measured for the undamaged structure (i.e., when all joints are undamaged) under random shaker excitation. The resulting signals are denoted as $U_{E=1,J=1}$, $U_{E=1,J=2}$, ..., $U_{E=1,J=n}$. The notation U indicates that the signal is measured at undamaged joint, while the subscripts E and J denote the experiment number and the joint number, respectively. In certain embodiments, the remaining experiments may be conducted one by one, in a sequential order.

According to certain embodiments, in each experiment, E=k+1, damage may be introduced at the joint J=k (by loosening its connection bolts in this study), and the n acceleration signals may be measured under random excitation. The measured signals may be denoted as $U_{E=k+1,J=1}$, ..., $D_{E=k+1,J=k}$, ..., $U_{E=k+1,J=n}$, where the notation D indicates that this signal was measured at the damaged joint k. After conducting the n+1 experiments, the signals measured at each joint i may be grouped together as follows in order to create the damaged/undamaged vectors required to train the corresponding CNN, $CNN_i$:

$$\text{Undamaged}_i = [U_{E=1,J=i} \ U_{E=2,J=i} \ ... \ U_{E=i,J=i} \ U_{E=i+2,J=i} \ ... \ U_{E=n+1,J=i}] \quad (11)$$

$$\text{Damaged}_i = [D_{E=i+1,J=i}] \quad (12)$$

According to certain embodiments, the undamaged data set for a particular joint i may include signals measured while, the other joints are undamaged ($U_{E=1,J=i}$) as well as signals measured while one of the other joints are damaged. The data generation and collection process may ensure that the effect of damaging a particular joint on the response of the other joints will not cause the CNNs to misclassify the undamaged joints as damaged.

Next, the aforementioned undamaged and damaged vectors may be divided to a large number of frames, where each frame contains a certain number of samples $n_s$. The result of this operation for joint i can be written as:

$$UF_i = [UF_{i,1} \ UF_{i,2} \ ... \ UF_{i,n_{uf}}] \quad (13)$$

$$DF_i = [DF_{i,1} \ DF_{i,2} \ ... \ DF_{i,n_{df}}] \quad (14)$$

where $UF_i$ and $DF_i$ are vectors containing the undamaged and damaged frames for the joint i, respectively, and $n_{uf}$ and $n_{df}$ are the total number of undamaged and damaged frames, respectively.

Given the total number of samples in each acceleration signal $n_T$; $n_{uf}$ and $n_{df}$ can be computed as:

$$n_{uf} = n \times \frac{n_T}{n_s} \quad (15)$$

$$n_{df} = \frac{n_T}{n_s} \quad (16)$$

From Equations (15) and (16), it can be seen that for a structure with a large number of joints (accelerometers) n, the number of undamaged frames for a particular joint may be significantly larger than the number of damaged frames. Training the CNN using extremely unbalanced undamaged/damaged frames may degrade the classification performance. Therefore, the frames corresponding to joint i may be balanced according to the following procedure: (1) the $n_{uf}$ frames in $UF_i$ are randomly shuffled to yield a new vector, $UFS_i$; and (2) the shuffled vector $UFS_i$ is truncated by taking only the first $n_{df}$ and remove the remaining frames resulting in a new undamaged vector $UFN_i$ that contains a total of $n_{df}$ frames.

In certain embodiments, $UF_i$ may be shuffled in order to make sure that the undamaged frames from all experiments have an equal chance of being selected. In other embodiments, all frames in vectors $UFN_i$ and $DF_i$ may be normalized between $-1$ to $1$, resulting in the final vectors $UFF_i$ and $DFF_i$ that may be used to train the CNN, $CNN_i$.

To train $CNN_i$, in certain embodiments, its parameters may be specified such as the number of convolutional layers and neurons, the number of hidden fully-connected layers and neurons, the kernel size, K, and the sub-sampling factor, ss. Finally, the CNN training may be carried out based on the data in $UFF_i$ and $DFF_i$ using BP as explained above. The entire data generation and CNNs training process according to certain embodiments is illustrated in FIG. 4.

According to certain embodiments, once all of the CNNs have been trained, they can be directly used to assess the condition of the structure. For example, each $CNN_i$ may be utilized to compute an index that reflects the likelihood of damage at joint i directly from the raw acceleration signal measured at its location. This can be done by: (1) inducing damage at one or more locations (or keep the structure undamaged); (2) applying a random shaker input; (3) measuring the acceleration signal at each joint; (4) dividing each acceleration signal to a number of frames, each containing a total of $n_s$ samples; (5) normalizing the frames between $-1$ to $1$; (6) feeding the normalized frames measured at each joint to the corresponding CNN ($CNN_i$); and (7) computing the probability of damage ($PoD_i$) at the $i^{th}$ joint as below:

$$PoD_i = \frac{D_i}{T_i} \quad (17)$$

where $T_i$ is the total number of frames processed by $CNN_i$, and $D_i$ is the number of frames classified as "damaged". The PoD computed at damaged joints may be significantly higher than the values for the undamaged joints. This gives a clear indication regarding both the presence and the location of a structural damage. For example, in certain embodiments, a PoD value close to 0.0 indicates that the corresponding location is undamaged, while a PoD value close to 1.0 indicates that the corresponding location is damaged. Further, PoD values within a range of about 0.0 to about 0.5 may indicate that the corresponding location is undamaged, while PoD values within a range of about 0.80 to about 1.0 may indicate that the corresponding location is damaged.

Experimental Results

The efficiency of the damage detection procedures described above may be determined. For instance, according to certain embodiments, in a first phase, only a single beam on the steel frame (n=5 joints) of the structural simulator was monitored. In a second phase, the performance of the damage detection approach was tested utilizing the entire structural simulator (n=30 joints).

Experimental Setup

In a setup for determining the efficiency of the damage detection procedures according to certain embodiments, the horizontal girder at the middle of the structural simulator was considered for the first phase of the experimental work. A total of 6 experiments were conducted to generate the data required for training. In each experiment, the acceleration signals were collected under a 0-512 Hz band-limited white noise shaker excitation at a sampling frequency of 1024 Hz. The signals were recorded for 256 s, so that each signal contains $n_\tau=262144$ samples. The shaker control and data acquisition operations were conducted using ME'ScopeVES software. Further, a Matlab code was used to group, divide into frames, balance, and normalize the data sets. The frame length $n_s$ was taken as 128 samples, therefore, vectors $UFF_i$ and $DFF_i$ contain a total of 2048 frames for each joint i. Only 50% of these frames were used for the training process (i.e., 1024 undamaged frames and 1024 damaged frames for each CNN).

Additionally, five CNNs were trained for the five joints along the tested girder. All the CNNs were selected to have a compact configuration with only two hidden convolution layers and two hidden fully-connected layers. According to certain embodiments, it may be possible to accomplish a high computational efficiency required, particularly for real-time detection. This also demonstrates that deep and complex CNN configurations are not really needed to achieve the desired detection performance. The structure and parameters of the 1D CNNs were obtained by trial-and-error. The 1D CNN configuration used in all experiments has (64, 32) neurons on the two hidden convolution layers and (10, 10) neurons on the two hidden fully-connected layers. The output (MLP) layer size was 2, which is the same as the number of classes. In addition, each CNN has a single input neuron which takes the input signal as the 128 time-domain samples of each frame in the training data set. The kernel size K, and the sub-sampling factor ss for all CNNs were set to 41 and 2, respectively.

For all experimental results, a two-fold stopping criteria for BP training was assigned: (1) the train classification error (CE) of 1%; and (2) maximum 100 BP iterations. Whenever either criterion is met, the BP training stops. The learning factor, $\epsilon$, may initially be set as 0.001 and the global adaptation is performed at each BP iteration. At each iteration, if the trained MSE decreases in the previous iteration, $\epsilon$ is increased by 5%; otherwise, $\epsilon$ is reduced by 30%.

Phase-1 Evaluation

FIG. 5(A) illustrates an undamaged joint according to certain embodiments, and FIG. 5(B) illustrates a damaged joint according to certain embodiments. In phase 1 of the evaluation according to certain embodiments, after carrying out the training of the five CNNs, the performance of the damage detection procedures may be tested against eight structural cases. Case 1 of the first phase of the experimental demonstration corresponds to the undamaged girder, while Cases 2 to 6 are associated with a single damage (i.e., damage at a single joint). In Cases 7 and 8, double damages were applied to the girder (i.e., simultaneous damage at two joints). According to certain embodiments, the testing process was conducted for each structural case. By processing the raw signals using the CNN-based algorithm, the eight PoD distributions shown in FIGS. 6(A) to 7(C) were obtained.

The results of the first phase indicates that the algorithm successfully evaluated the condition of the monitored girder as undamaged. For Cases 2 to 6 (single damage cases), the algorithm successfully assigned high PoD values (i.e., close to 1.0) to the damaged joints, while the computed PoD values for the intact joints were very low. Further, for both double damage cases (Cases 7 and 8), high PoD values were obtained for the two damaged joints, and much lower PoD values were assigned to the remaining joints.

Phase—2 Evaluation

For the second phase of the experimental work, the entire steel frame consisting of n=30 joints was monitored. Therefore, a total of 31 experiments were needed to generate the training data. The same data generation and CNN training parameters used in the first phase were used again for the second phase. The average classification error of the resulting 30 CNNs over the training data was found to be about 0.54%.

Figure 8:
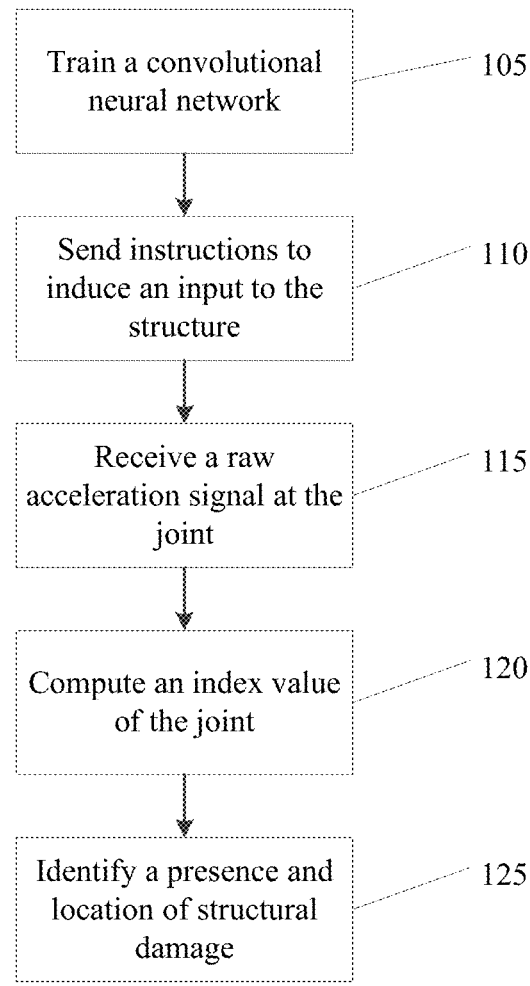
FIG. 8 illustrates an example of a method according to certain embodiments.
Figure 9:
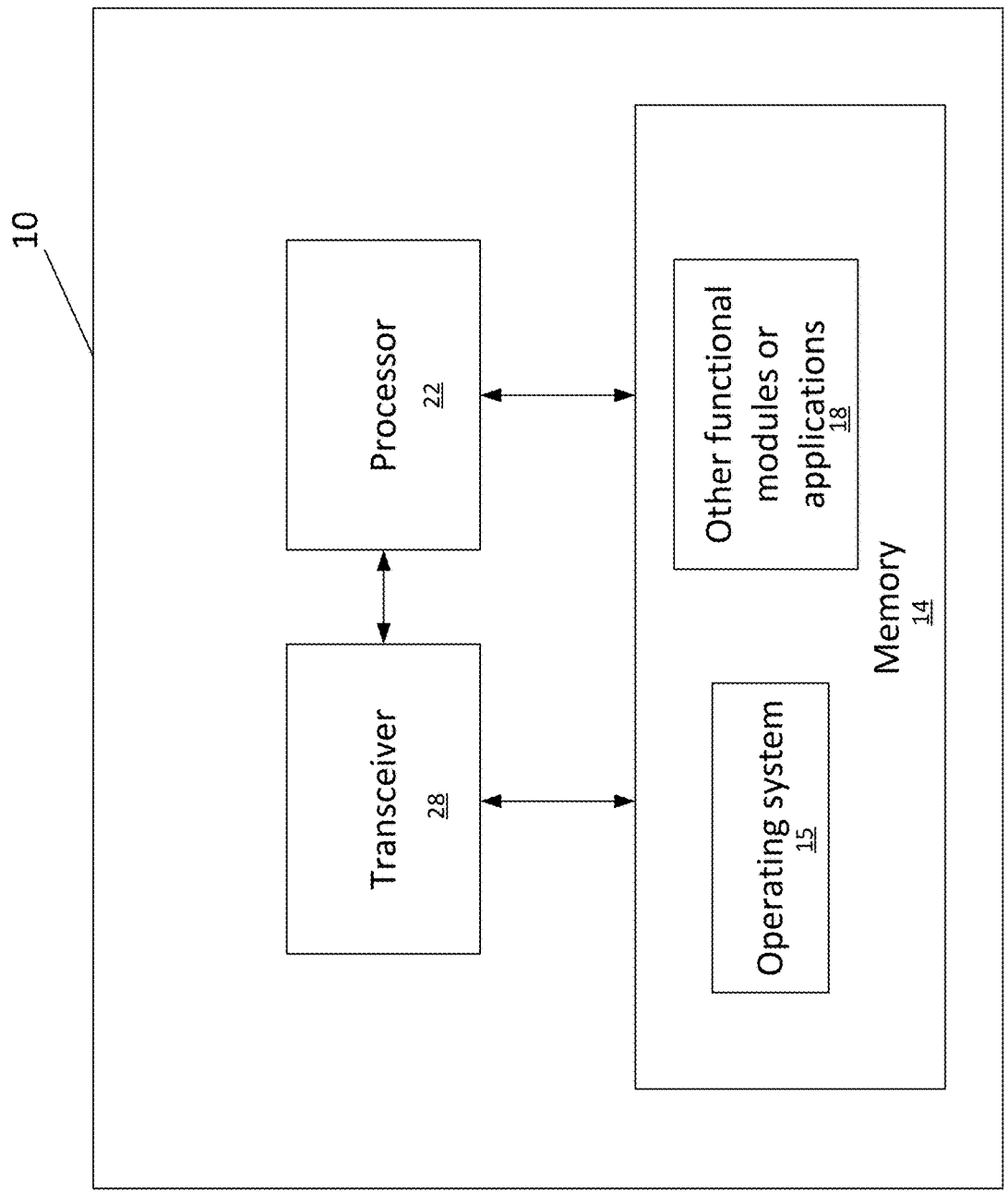
FIG. 9 illustrates an example of an apparatus according to certain embodiments.

To test the performance of the resulting 30 CNNs, the algorithm was tested against 24 structural cases (undamaged case +18 single damage cases +5 double damage cases). The PoD distributions obtained for 24 structural cases are illustrated in FIGS. 8-10 in the form of "heat maps". For Case 1 (undamaged case), the algorithm assigned low PoD values (less than 0.5) to all joints in the structure. For the single damage cases (Cases 2-19), the PoD maps correctly indicate significant damage at the damaged joint. Also, very good performance was achieved for the first three double damage cases (Cases 20-22), where the highest PoD values were assigned exactly to the two loosened joints.

In Case 23, the performance of the algorithm was tested when two adjacent joints were damaged. The results obtained for this case were satisfactory, however, a high PoD value was incorrectly assigned to an undamaged joint (i.e., joint (6,3)). Also, for Case 24 where two joints along the structure's line of symmetry were damaged, the PoD map did not reflect the damage location accurately. Considering the very slight damage introduced to the structural system (only loosening the bolts of the connections), the results of the two phases demonstrate an elegant performance of the damage detection algorithm in assessing the condition of structures and locating single damages.

The adaptive 1D CNN classifier, according to certain embodiments, may be implemented in C++ using MS Visual Studio 2013 in 64-bit. This program may be capable of carrying out the forward and back-propagation operations required for training and using the CNNs. Also, a Matlab code may be written and used to extract vectors $UFF_i$ and $DFF_i$ directly from the signals collected in the experiments as detailed above. Another Matlab code may be used to generate the PoD distribution directly from the raw acceleration signals using the trained CNNs as explained above. The experiments were conducted using a computer with I7-4910 MQ at 2.9 GHz (8 cores) and 32-Gb memory.

FIG. 8 illustrates a method according to certain embodiments. In particular, FIG. 12 illustrates a method performed by a computer device. The computer device, for example, may be a computer that detects structural damage, and has inherent adaptive design to fuse both feature extraction and classification blocks into a single and compact learning body. In step 105, the computer device may train a convolutional neural network (CNN) for a joint of a structure. In step 110, the computer device may send instructions to a modal shaker to induce an input to the structure. In step 115, the computer device may receive, as a result of the induced input, a raw acceleration signal at the joint. In step 120, the computer device may compute, based on the trained CNN and the raw acceleration signal, an index value of the joint. According to an embodiment, the index value may represent a likelihood of damage at the joint. In step 125, the computer device may identify, according to the index value, a presence of a location of structural damage of the structure.

In certain embodiments, computing the index value may include dividing the acceleration signal to a number of frames that each include a total number of $n_x$ samples. The computation of the index value may also include normalizing the frames between −1 to 1, and feeding the normalized frames measured at the joint to the CNN. The computation of the index value may further include determining a probability of damage (PoD) at the joint by dividing a number of frames classified s damaged by a total number of frames processed by the CNN. When the PoD value is high, then it may provide an indication that the joint is likely to be damaged. Alternatively, when the PoD value is low, it may provide an indication that the joint is likely to be undamaged.

For example, in certain embodiments, a PoD value close to 0.0 indicates that the corresponding location is undamaged, while a PoD value close to 1.0 indicates that the corresponding location is damaged. Further, PoD values within a range of about 0.0 to about 0.5 may indicate that the corresponding location is undamaged, while PoD values within a range of about 0.80 to about 1.0 may indicate that the corresponding location is damaged.

FIG. 9 illustrates an apparatus 10 according to certain embodiments. It should be understood that each signal or block in FIGS. 2, 4, and 8 may be implemented by various means or their combinations, such as hardware, software, firmware, one or more processors and/or circuitry. In one embodiment, apparatus 10 may be a device that detects structural damage, and has inherent adaptive design to fuse both feature extraction and classification blocks into a single and compact learning body (such as a computer or other similar device), for example. In another embodiment, apparatus 10 may be a device, such as an accelerometer, that measures acceleration signals, vibration signals, and other similar signals. In a further embodiment, apparatus 10 may be a device, such as a modal shaker for example, that induces or generates vibrations, excitation signals, random shaker inputs, or the like. In yet another embodiment, apparatus 10 may be a device, such as a 16-channel data acquisition device, that is used to generate shaker input and collect acceleration output. In another embodiment, apparatus 10 may be a device, such as a power amplifier, that increases the power of a signal, such as a time-varying voltage or current. Although only one apparatus 10 is shown in FIG. 9, in other embodiments, more than one apparatus 10 may be implemented together in various combinations as a system or independently.

Apparatus 10 may include a processor 22 for processing information and executing instructions or operations. Processor 22 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. Processor 22 may be implemented as a single controller, or a plurality of controllers or processors.

For firmware or software, the implementation may include modules or unit of at least one chip set (for example, procedures, functions, and so on). Memory 14 may independently be any suitable storage device such as those described above. The memory and the computer program instructions may be configured, with the processor for the particular device, to cause a hardware apparatus such as apparatus 10, to perform any of the processes described above (see, for example, FIGS. 2-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Alternatively, certain embodiments may be performed entirely in hardware.

According to certain embodiments, memory 14 may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media.

Apparatus 10 may also include one or more antennas (not shown) for transmitting and receiving signals and/or data to and from apparatus 10. Apparatus 10 may further include a transceiver 28 that modulates information onto a carrier waveform for transmission by the antenna(s), demodulates information received via the antenna(s) for further processing by other elements of apparatus 10. In other embodiments, transceiver 28 may be capable of transmitting and receiving signals or data directly.

According to certain embodiments, processor 22 may perform functions associated with the operation of apparatus 10 including, without limitations, any of the procedures described above and illustrated in the figures.

In other embodiments, memory 14 may store software modules that provide functionality when executed by processor 22. The modules may include an operating system 15 that provides operating system functionality for apparatus 10. Memory 14 may also store one or more functional modules 18, such as an application or program, to provide additional functionality for apparatus 10. The components of apparatus 10 may be implemented in hardware, or as any suitable combination of hardware and software.

According to certain embodiments, it may be possible to provide an adaptive implementation of 1D CNNs, which may demonstrate a high performance level for real-time SHM and structural damage detection processes. For instance, the results described herein demonstrated the superior ability of the compact 1D CNNs to learn the extraction of optimal features automatically and directly from the raw accelerometer data, not requiring any feature extraction, and any pre- or post-processing. The approach according to certain embodiments not only achieves a high level of generalization, but also eliminates the need for manual model or parameter tuning on any hand-crafted feature extraction. This fact makes the algorithm applicable for monitoring almost any civil infrastructure.

Due to the simple structure of the 1D CNNs that requires only 1D convolutions (scalar multiplications and additions), a mobile and low-cost hardware implementation of the described approach is quite feasible. Moreover, since the CNN-based method is computationally inexpensive, it can be easily applied for real-time structural health monitoring of any engineering structure (e.g., civil, mechanical, or aerospace).

According to other embodiments, the CNNs were capable of learning directly from the acceleration data measured under random excitations. In all training and testing steps, the excitation input was assumed to be unknown. Therefore, the described algorithm may very promising for monitoring civil structures under ambient vibration (i.e., damage detection using output-only data).

Further, conventional centralized algorithms require the signals measured at all locations to be collected and transferred to a single processing unit. Thus, transferring and synchronizing large amount of data can be problematic especially when a wireless sensor network is used for SHM. On the other hand, the algorithm according to certain embodiments may be decentralized, which means that a unique classifier (CNN) may be assigned to each location. Each CNN may process only the locally-available data to assess the structural condition at its location. Hence, the method according to certain embodiments offers an effective solution to overcome this problem.

According to certain embodiments therefore, it may be possible to provide a fast and highly accurate nonparametric vibration-based algorithm for structural damage detection based on adaptive 1D CNN. It may also be possible to identify and locate any structural damage in real-time by processing raw vibration signals acquired by a network of accelerometers. With a proper adaptation over the traditional CNNs, certain embodiments can directly classify the accelerometer signal without requiring any feature extraction, pre- or post-processing. Consequently, this leads to an efficient system in terms of speed, allowing a real-time application. Due to the CNNs ability to learn to extract the optimal features, with a proper training, the system according to certain embodiments can achieve superior damage detection and localization accuracy despite the noise-like and uncorrelated patterns of the accelerometer signal. Some samples of the latter are shown in FIG. 1, which shows sample accelerometer signals from undamaged (top) and damaged (bottom) joints. Furthermore, according to other embodiments, simple CNN configurations can easily achieve a high detection performance compared to the complex ones commonly used for deep learning tasks over such complex and uncorrelated signals that can even defy a human expert inspector.

According to certain embodiments, with the CNN-based damage detection technique, it may be possible to significantly reduce the computational time and effort required to classify the signals. To illustrate this feature, the same CNN configuration may be used. The acceleration signal used for this illustration may be acquired at a sampling frequency of 1024 Hz, and therefore it may include 1024 samples. The signal may be divided to eight frames, each having 128 samples. Accordingly, the total time required for the classification of 1-sec signal was only 22 msec. Further, this speed was about 45× faster than the real-time requirement.

According to other embodiments, it may be possible to use the CNN-algorithm described herein in any SHM and damage detection system for any large-scale structure including, for example, but not limited to: buildings; stadia; bridges; tunnels; off-shore platforms; towards; pipeline networks; dams; wind turbines; airplanes; ships; aerospace structures; and more. Certain embodiments may also serve as an automated damage detection and classification system for civil engineers, mechanical engineers, aerospace engineers, and experts in this field. The CNNs, according to certain embodiments, may be capable of learning directly from the acceleration data measured under random excitations. In all training and testing steps, the excitation input may be assumed to be unknown. Thus, the algorithm according to certain embodiments may be quite promising for monitoring civil structures under ambient vibration (i.e., damage detection using output-only data).

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. A method for identifying a presence and a location of structural damage, comprising:
   training a one-dimensional convolutional neural network (CNN) applied a joint of a structure;
   sending instructions to a modal shaker to induce an input to the structure;
   receiving, as a result of the induced input, a raw acceleration signal at the joint;
   computing, based on the trained one-dimensional CNN and the raw acceleration signal, an index value of the joint; and
   identifying, according to the index value, a presence of a location of structural damage of the structure,
   wherein the index value represents a likelihood of damage at the joint, and
   wherein the computing of the index value comprises
      dividing the acceleration signal to a number of frames that each include a total number of $n_s$ samples;
      normalizing the frames between −1 to 1;
      feeding the normalized frames measured at the joint to the one-dimensional CNN; and
      determining a probability of damage (PoD) at the joint by dividing a number of frames classified s damaged by a total number of frames processed by the one-dimensional CNN.

2. The method of claim 1, wherein a high PoD value within a range of about 0.8 to about 1.0 provides an indication that the joint is likely to be damaged, and a low PoD value within a range of about 0.0 to about 0.5 provides an indication that the joint is likely to be undamaged.

3. The method of claim 1, wherein the acceleration signal is measured by an accelerometer that is disposed at the location of the joint.

4. The method of claim 1,
   wherein the training of the one-dimensional CNN comprises conducting a plurality of experiments to generate a training data set for training the one-dimensional CNN,
   wherein each of the plurality of experiments comprises measuring acceleration signals at an undamaged joint as a result of an application of a random shaker excitation at the undamaged joint, and
   wherein each of the plurality of experiments comprises introducing damage at the undamaged joint to create a damaged joint, and measuring acceleration signals at the damaged joint as a result of the application of the random shaker excitation at the damaged joint.

5. An apparatus, comprising:
   at least one memory comprising computer program code; and
   at least one processor;
   wherein the at least one memory and the computer program code are configured, with the at least one processor, to cause the apparatus at least to:

train a one-dimensional convolutional neural network (CNN) applied a joint of a structure;
send instructions to a modal shaker to induce an input to the structure;
receive, as a result of the induced input, a raw acceleration signal at the joint;
compute, based on the trained one-dimensional CNN and the raw acceleration signal, an index value of the joint; and
identify, according to the index value, a presence of a location of structural damage of the structure,
wherein the index value represents a likelihood of damage at the joint, and
wherein the apparatus is further caused to, in the computation of the index value,
divide the acceleration signal to a number of frames that each include a total number of $n_s$ samples;
normalize the frames between −1 to 1;
feed the normalized frames measured at the joint to the one-dimensional CNN; and
determine a probability of damage (PoD) at the joint by dividing a number of frames classified s damaged by a total number of frames processed by the one-dimensional CNN.

6. The apparatus of claim 5, wherein a high PoD value within a range of about 0.8 to about 1.0 provides an indication that the joint is likely to be damaged, and a low PoD value within a range of about 0.0 to about 0.5 provides an indication that the joint is likely to be undamaged.

7. The apparatus of claim 5, wherein the acceleration signal is measured by an accelerometer that is disposed at the location of the joint.

8. The apparatus of claim 5, wherein the at least one memory and the computer program code are further configured, with the at least one processor, to cause the apparatus at least to, in the training of the one-dimensional CNN:
conduct a plurality of experiments to generate a training data set for training the one-dimensional CNN,
wherein each of the plurality of experiments includes measuring acceleration signals at an undamaged joint as a result of an application of a random shaker excitation at the undamaged joint, and
wherein each of the plurality of experiments includes introducing damage at the undamaged joint to create a damaged joint, and measuring acceleration signals at the damaged joint as a result of the application of the random shaker excitation at the damaged joint.

9. A computer program, embodied on a non-transitory computer readable medium, the computer program, when executed by a processor, causes the processor to:
train a one-dimensional convolutional neural network (CNN) applied a joint of a structure;
send instructions to a modal shaker to induce an input to the structure;
receive, as a result of the induced input, a raw acceleration signal at the joint;
compute, based on the trained one-dimensional CNN and the raw acceleration signal, an index value of the joint;
identify, according to the index value, a presence of a location of structural damage of the structure,
wherein the index value represents a likelihood of damage at the joint, and
wherein the processor is further caused to, in the computation of the index value,
divide the acceleration signal to a number of frames that each include a total number of $n_s$ samples;
normalize the frames between −1 to 1;
feed the normalized frames measured at the joint to the one-dimensional CNN; and
determine a probability of damage (PoD) at the joint by dividing a number of frames classified s damaged by a total number of frames processed by the one-dimensional CNN.

10. The computer program of claim 9, wherein a high PoD value within a range of about 0.8 to about 1.0 provides an indication that the joint is likely to be damaged, and a low PoD value within a range of about 0.0 to about 0.5 provides an indication that the joint is likely to be undamaged.

11. The computer program of claim 9, wherein the acceleration signal is measured by an accelerometer that is disposed at the location of the joint.

12. The computer program of claim 9, wherein the computer program, when executed by the processor, further causes the processor to, in the training of the one-dimensional CNN:
conduct a plurality of experiments to generate a training data set for training the one-dimensional CNN,
wherein each of the plurality of experiments includes measuring acceleration signals at an undamaged joint as a result of an application of a random shaker excitation at the undamaged joint, and
wherein each of the plurality of experiments includes introducing damage at the undamaged joint to create a damaged joint, and measuring acceleration signals at the damaged joint as a result of the application of the random shaker excitation at the damaged joint.

* * * * *